No. 846,707. PATENTED MAR. 12, 1907.
D. O. WARD.
COMPOSITE BRAKE SHOE.
APPLICATION FILED JAN. 22, 1906.
4 SHEETS—SHEET 1.
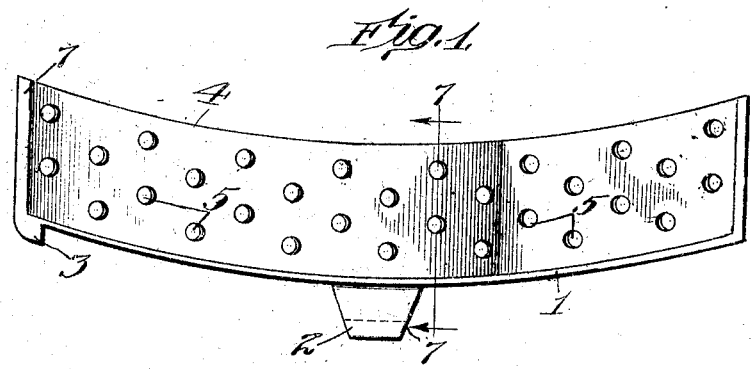
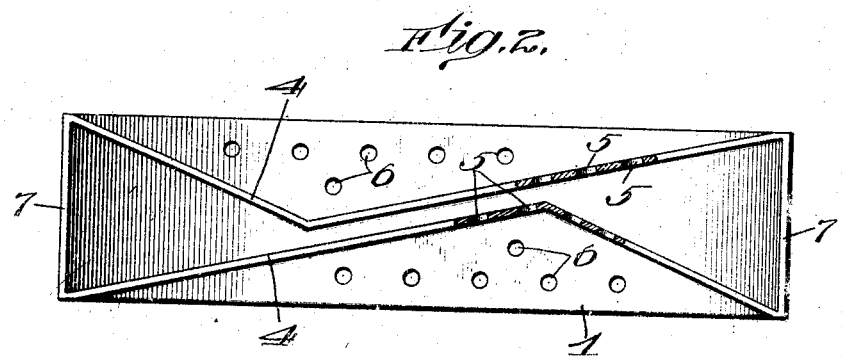
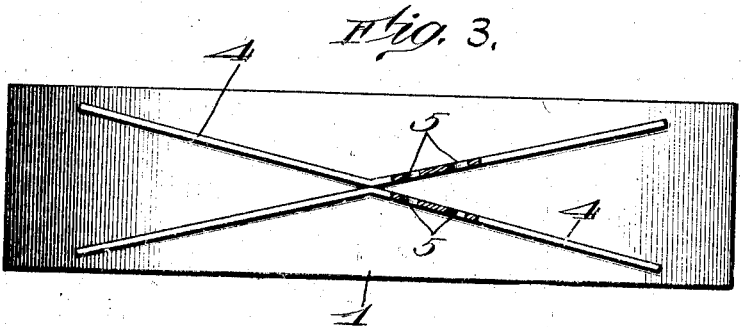
Witnesses:
Robert H. Weir
Geo. D. Perry
Inventor:
Daniel O. Ward
by Hill & Hill,
Attys.

No. 846,707. PATENTED MAR. 12, 1907.
D. O. WARD.
COMPOSITE BRAKE SHOE.
APPLICATION FILED JAN. 22, 1906.
4 SHEETS—SHEET 3.
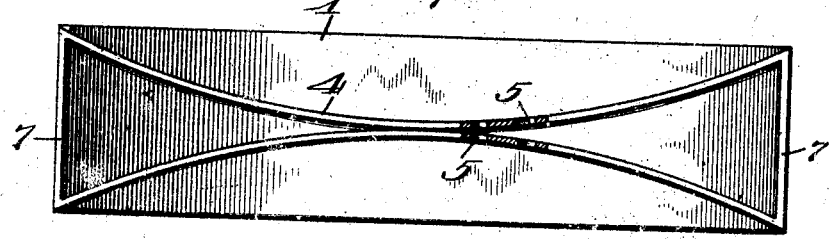
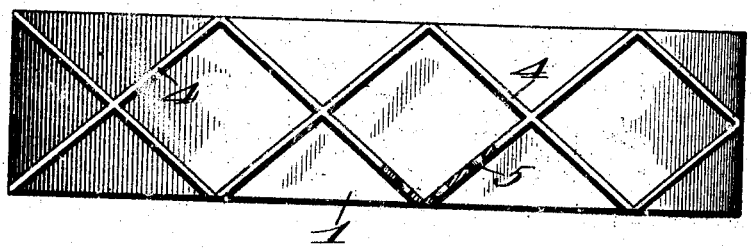
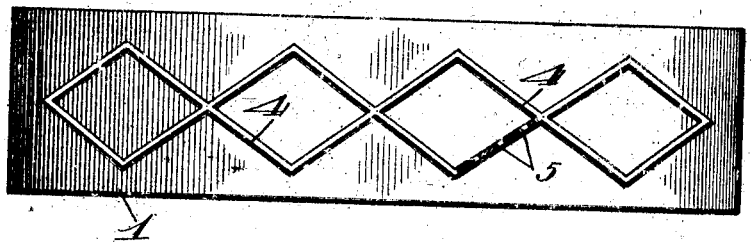
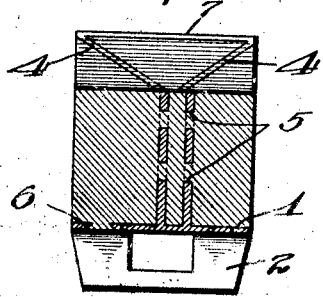
Witnesses:
Robert H. Weir
Geo. D. Perry
Inventor:
Daniel O. Ward
by Hill & Hill
Attys No. 846,707. PATENTED MAR. 12, 1907.
D. O. WARD.
COMPOSITE BRAKE SHOE.
APPLICATION FILED JAN. 22, 1906.
4 SHEETS—SHEET 3.
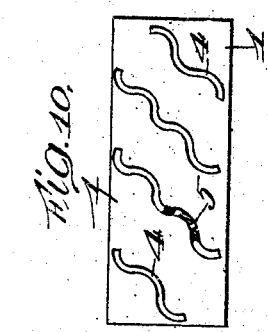
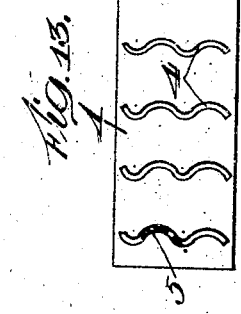
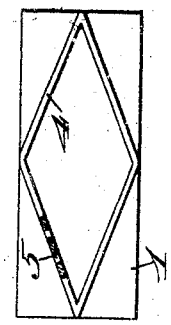
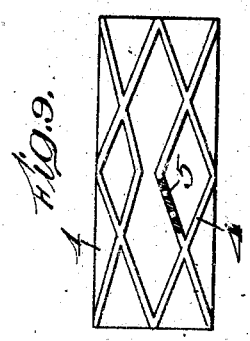
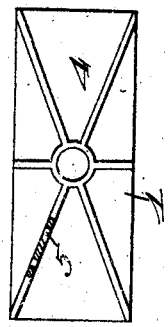
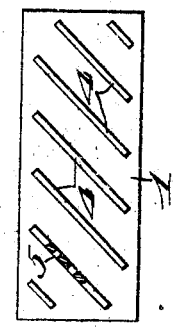
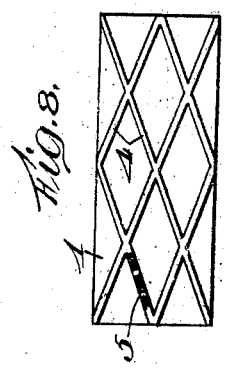
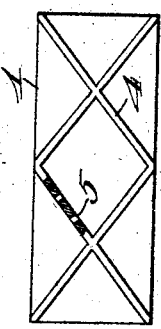
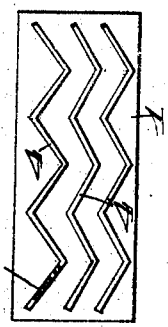

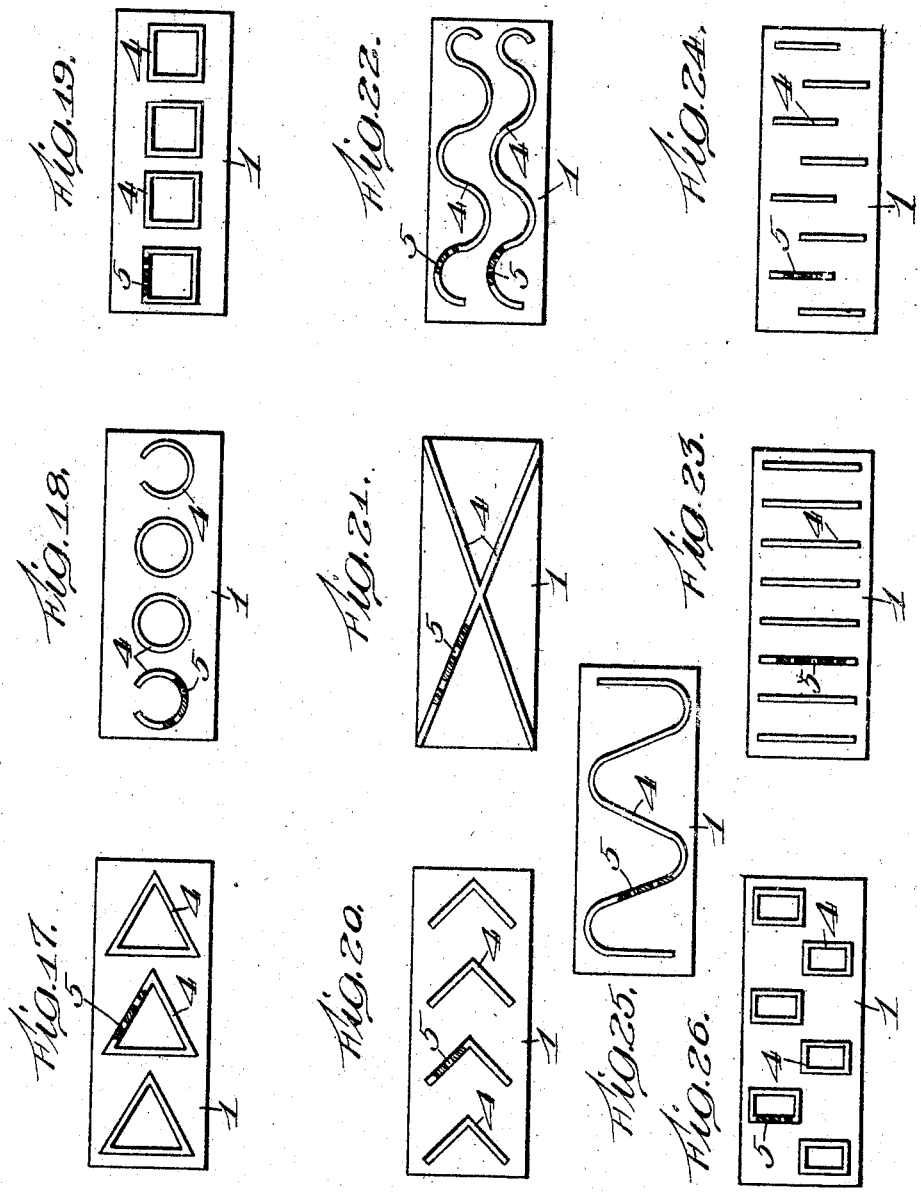

UNITED STATES PATENT OFFICE.

DANIEL O. WARD, OF OAK PARK, ILLINOIS.

COMPOSITE BRAKE-SHOE.

No. 846,707.  Specification of Letters Patent.  Patented March 12, 1907.

Application filed January 22, 1906. Serial No. 297,300.

*To all whom it may concern:*

Be it known that I, DANIEL O. WARD, a citizen of the United States, residing at Oak Park, county of Cook, and State of Illinois, have invented a certain new and useful Improvement in Composite Brake-Shoes, of which the following is a description.

My invention relates to that class of brake-shoes which are formed of two or more grades of metal each exposed at the wearing-face of the shoe and simultaneously reduced as the shoe is worn away in service.

The object of my invention is to produce a brake-shoe of the class described which will combine the best braking and wearing qualities and the greatest strength for attachment to the brake-head and to resist breaking and falling in fragments upon the track when partly worn away in service.

To this end my invention consists in the novel construction, arrangement, and combination of parts herein shown and described, and more particularly pointed out in the claims.

In the accompanying drawings, wherein like or similar reference characters indicate like or corresponding parts, Figure 1 is an elevation of a brake-shoe back and inserts. Fig. 2 is a plan view of the same. Figs. 3, 4, 5, 6, and 8 to 26, inclusive, are plan views of modified forms of the same. Fig. 7 is a section taken substantially on line 7 7 of Fig. 1, showing part of a finished brake-shoe.

In this description and in the claims by "inserts" I desire to be understood as meaning any portion positioned in the body of the shoe and which will be inclosed within the shoe-body when the same is completed.

The brake-shoes in general use are at the present time usually made of a comparatively hard cast-iron to prolong the life of the shoe, and considerable loss is sustained by the railroads from breakage of these shoes, from the actual loss of the shoes, from accidents caused by the fragments lodging in or upon frogs, switches, and crossings, and from the fact that to avoid these losses all shoes are taken out of service and consigned to the scrap-pile long before they are actually worn out.

In my improved brake-shoe shown in the drawings a back plate 1 is provided of the usual or any preferred form, provided with the usual key-lug 2 and guide-lugs 3 3 and having any desired number and shape of inserts 4, projecting forward to the normal face of the shoe and adapted to be embedded in the body of the finished shoe. This back and the inserts are preferably formed integral and, to practically eliminate the risk of breakage, of some strong and tough material which used alone might be very undesirable for the friction-face of a brake-shoe.

As shown, a plurality of openings 5 5 are formed through each of the inserts 4 to secure the body portion of the shoe permanently in place. Also, if desired, openings 6 6 may be provided in the back 1, so formed that the body portion of the shoe may extend into the openings and rigidly and positively lock the body to the back plate. The body portion of the shoe may consist of any suitable material, preferably cast-iron, and is simply cast about the inserts and upon the back, as shown in Fig. 7, by providing a suitable mold, placing the back plate and inserts in suitable position in the mold, and introducing the molten body material into the mold, thus forming practically a perfect fit between the body and back and inserts, which, if desired, may be tinned or otherwise treated to produce a more perfect union between the parts.

In the forms shown in Figs. 2 and 4 the back plate 1 is extended forward at each end of the shoe to the wearing-face, thus forming an inclosing wall 7 at the ends of the shoe; but in no case do I desire to be understood as contemplating such a wall at the sides of the shoe or of forming a continuous inclosure about the body portion of the shoe. Obviously, however, the above does not refer to an inclosure or a plurality of inclosures within the body of the shoe, as shown in Figs. 5, 6, 11, or 16, or any other form where a portion of the body material of the shoe is positioned outside the inclosing walls, and whereas various forms of my device are shown in the accompanying drawings I do not wish to be understood as limiting myself to the exact forms or construction herein shown.

What I claim as new, and desire to secure by Letters Patent, is—

1. A brake-shoe, comprising a back plate without marginal inclosing projections, provided with one or more projecting inserts upon its front side, in combination with a body positioned upon the back, arranged about and secured to said inserts, and means for securing said shoe in position.

2. A brake-shoe, comprising a back plate without marginal inclosing projections, provided with one or more projecting inserts upon its front side formed integral therewith, in combination with a body positioned upon said back arranged about and secured to said inserts, and means for securing said shoe in position.

3. A brake-shoe, comprising a back plate without marginal inclosing projections, provided with one or more projecting inserts upon its front side, each insert having a plurality of transverse openings therethrough, in combination with a metal body positioned upon said back, arranged about said inserts and entering the openings therein, and means for securing said shoe in position.

4. A brake-shoe, comprising a back plate without marginal inclosing projections, provided with a key-lug upon its back formed integral therewith and one or more projecting inserts upon its front side, in combination with a body positioned upon said back, arranged about said inserts, and independently attached to said back and inserts.

5. A brake-shoe, comprising a metal back plate without marginal projections provided with a keyway extension upon its back, projections upon its front side extending to the face of the shoe and formed integral with said back plate, in combination with a cast-iron body surrounding said projection.

6. A brake-shoe, comprising a back plate without marginal projections provided with one or more inserts upon its front side formed integral therewith and extending to the wearing-face of the shoe, in combination with a metal body positioned upon said back and arranged about and secured to said inserts, and means for securing said shoe in position.

7. A brake-shoe, comprising a back plate without marginal projections, one or more sheet or plate inserts mounted thereon formed integral therewith and extending to the wearing-face of the shoe, in combination with a metal body positioned upon the back plate, arranged about the inserts and independently attached to said back plate and said inserts, and means for securing said shoe in position.

8. A brake-shoe, comprising a back plate without marginal projections provided with openings, one or more inserts mounted upon its front side formed integral therewith and, extending to the wearing-face of the shoe, in combination with a metal body positioned upon said back plate and interlocking with the openings therein, and arranged about and attached to said inserts, and means for securing said shoe in position.

9. A brake-shoe, comprising a back plate provided with a key-lug upon its back formed integral therewith, one or more sheet or plate inserts mounted thereon and extending to the wearing-face of the shoe, each insert having a transverse opening formed therein, in combination with a metal body positioned upon said back plate, arranged about and interlocking with said inserts, and means for securing said shoe in position.

10. A brake-shoe, comprising a back plate provided with openings, and one or more sheet or plate inserts mounted upon its front side extending to the wearing-face of said shoe, each insert having a transverse opening formed therein, in combination with a metal body positioned upon said back plate, arranged about said inserts and interlocking with the openings in said back plate and said inserts, and means for securing said shoe in position.

11. A brake-shoe, comprising a back plate provided with one or more sheet or plate inserts formed integral therewith, extending to the wearing-face of the shoe, both the inserts and the back plate having openings formed therein, in combination with a metal body positioned upon the back plate and arranged about said inserts and interlocking with the openings in said inserts and said back plate, and means for securing said shoe in position.

12. A brake-shoe, comprising a back plate provided with one or more sheet or plate inserts formed integral therewith, extending to the wearing-face of the shoe, both the inserts and the back plate having openings formed therein, in combination with a metal body positioned upon the back plate and arranged about said inserts and interlocking with the openings in said inserts and said back plate and means upon the back plate for securing said shoe in position.

13. A brake-shoe back of suitable form without marginal projections, provided with one or more inserts positioned upon its front side and adapted to extend to the wearing-face of the shoe, and means formed integral with said back for securing the finished shoe in position.

14. A brake-shoe back plate of suitable form, provided with one or more inserts formed integral therewith positioned upon its front side and adapted to extend to the wearing-face of the shoe, and means upon said back plate for securing the finished shoe in position.

15. A brake-shoe back plate of suitable form provided with one or more sheet or plate inserts formed integral therewith positioned upon its front side and adapted to extend to the wearing-face of the shoe, and means upon the back plate for securing the finished shoe in position.

16. A brake-shoe back plate of suitable form, provided with one or more inserts positioned upon its front side each insert provided with transverse openings, and means upon said back plate for securing the finished shoe in position.

17. A brake-shoe back plate of suitable form provided with openings, one or more inserts mounted upon its front side and adapted to extend to the wearing-face of the shoe, and means formed integral with said back plate for securing the finished shoe in position.

18. A brake-shoe back plate of suitable form provided with one or more inserts upon its front side adapted to extend to the wearing-face of the shoe, both the inserts and the back plate having openings formed therein, and means upon the back plate for securing the finished shoe in position.

19. A brake-shoe back plate of suitable form provided with one or more sheet or plate inserts upon its front side formed integral therewith, both the inserts and said back plate having interlocking means formed thereon, and means upon the back plate for securing the finished shoe in position.

20. A brake-shoe back plate of suitable form without marginal projections provided with one or more projecting inserts upon its front side, interlocking means upon said inserts, and means formed integral with said back plate for securing the finished shoe in position.

21. A brake-shoe, comprising a back plate without marginal projections provided with one or more projecting inserts upon its front side, and a body positioned upon the back inclosing said inserts, in combination with interlocking means between said body and said inserts and means formed integral with said back plate for securing said shoe in position.

22. A brake-shoe, comprising a back plate provided with inserts upon its front side projecting to the wearing-face of the shoe, and a metal body positioned upon the back plate inclosing said inserts, in combination with interlocking means between said body and the inserts and back plate, and means formed integral with said back plate for securing said shoe in position on a brake-head.

23. A brake-shoe, comprising a metal back plate without marginal projections provided with a keyway extension upon its back side, projections upon its front side extending toward the face of the shoe and formed integral with said back plate, in combination with a cast-metal body surrounding said projection.

In testimony whereof I have hereunto signed my name in the presence of two subscribing witnesses.

DANIEL O. WARD.

Witnesses:
ROY W. HILL,
CHARLES I. COBB.